US010652201B1

(12) United States Patent
Gibson et al.

(10) Patent No.: US 10,652,201 B1
(45) Date of Patent: May 12, 2020

(54) CLOUD SERVICE REGISTRY

(71) Applicant: EMC Corporation, Hopkinton, MA (US)

(72) Inventors: Braden Barry Gibson, Valrico, FL (US); Ming Zhang, Stoughton, MA (US); Andrew Gonczi, Woodstock, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 15/145,013

(22) Filed: May 3, 2016

Related U.S. Application Data

(60) Provisional application No. 62/156,437, filed on May 4, 2015.

(51) Int. Cl.
*H04L 29/06* (2006.01)
*H04L 29/12* (2006.01)
*H04L 29/08* (2006.01)

(52) U.S. Cl.
CPC .............. *H04L 61/20* (2013.01); *H04L 63/08* (2013.01); *H04L 67/10* (2013.01); *H04L 67/12* (2013.01); *H04L 29/06* (2013.01); *H04L 61/6022* (2013.01); *H04L 63/0428* (2013.01)

(58) Field of Classification Search
CPC ...... H04L 29/06; H04L 63/08; H04L 63/0428
See application file for complete search history.

(56) References Cited

U.S. PATENT DOCUMENTS

| 7,356,837 | B2 | 4/2008 | Asghari-Kamrani | |
|---|---|---|---|---|
| 7,444,676 | B1 | 10/2008 | Asghari-Kamrani | |
| 8,266,432 | B2 | 9/2012 | Asghari-Kamrani | |
| 8,281,129 | B1 | 10/2012 | Asghari-Kamrani | |
| 2002/0120685 | A1* | 8/2002 | Srivastava | G06F 9/44 709/203 |
| 2005/0044197 | A1* | 2/2005 | Lai | G06Q 10/10 709/223 |
| 2015/0113599 | A1* | 4/2015 | Curtis | H04L 63/0428 726/4 |
| 2016/0205097 | A1* | 7/2016 | Yacoub | H04L 63/0876 726/6 |

* cited by examiner

*Primary Examiner* — Aftab N. Khan
(74) *Attorney, Agent, or Firm* — Krishnendu Gupta; Lesley Leonessa

(57) ABSTRACT

A system, program product, and computer implemented method comprising receiving a request from a requester, authenticating the requester, and based on a successful authentication: receiving an unique ID from the requester, looking up the unique ID from the requester, and sending an address to the requester.

20 Claims, 10 Drawing Sheets

CLOUD SERVICE REGISTRY

RELATED APPLICATIONS

This application claims priority to U.S. Provisional Patent Application No. 61/931,502 titled "ADVANCED OBJECT SERVICE" filed on May 4, 2015, which is incorporated in its entirety herein by reference for all purposes.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

As it is generally known, "cloud computing" typically refers to the use of remotely hosted resources to provide services to customers over one or more networks such as the Internet. Resources made available to customers are typically virtualized and dynamically scalable. Usually, cloud computing services may include any specific type of application. Conventionally, the software and data used to support cloud computing services are located on remote servers owned by a cloud computing service provider. Recently, use of the cloud computing service model has been growing due to the increasing availability of high bandwidth communication, making it possible to obtain response times from remotely hosted cloud-based services similar to those of services that are locally hosted.

SUMMARY

A system, program product, and computer implemented method comprising receiving a request from a requester, authenticating the requester, and based on a successful authentication: receiving an unique ID from the requester, looking up the unique ID from the requester, and sending an address to the requester.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
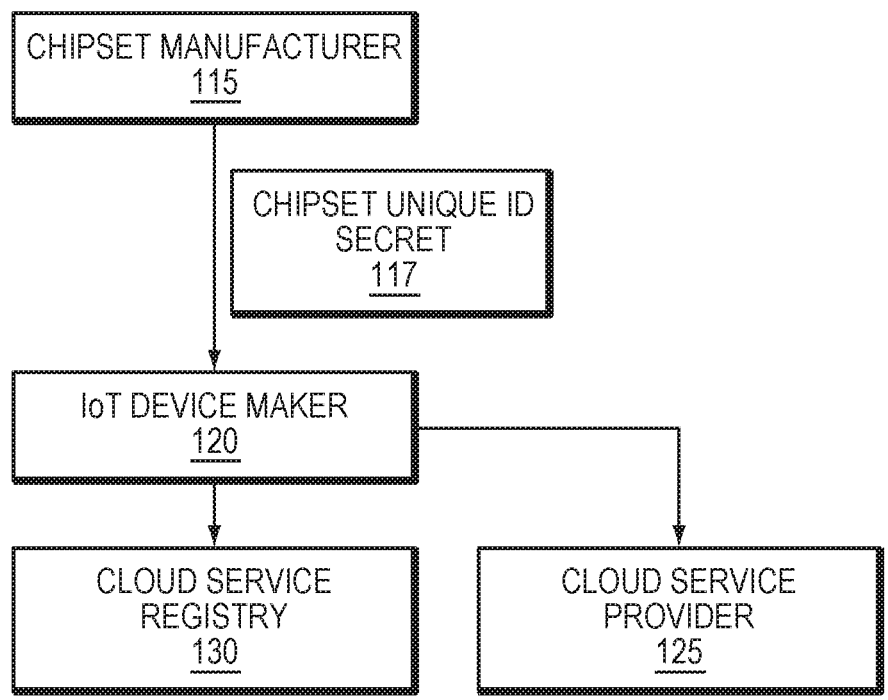
FIG. 1 is a simplified illustration of a chip manufacturer, an IoT device manufacturer, a cloud service provider, and a cloud service registry, in accordance with an embodiment of the present invention.

Typically, the Internet of things (IoT) may be increasing in popularity. Conventionally, quality of device interfaces to the internet is highly variable. In many embodiments, the current disclosures may enable a reduced complexity for integrating a device to the internet. In further embodiments, the current disclosure may create an open environment for a Cloud Service Provider (CSP) to compete for device makers' data.

Generally, IoT may refer to an increasing amount of internet-attached devices. In some embodiments, IoT devices may exist in locations and roles where devices had not been previously deployed. In some embodiments, IoT Sensors may transmit data from refrigerator temperature to soil quality. In other embodiments, an IoT device may control and monitor points and in other embodiments IoT devices manage door locks, pumps, and thermostats respectively. In many embodiments, a value of IoT sensor data may improve when it is aggregated with other data sources, such as weather or cost data, or simply the data from other sensors.

In some embodiments, IoT may be growing in a new market filled with many competing companies. In most embodiments, there may not a standard for IoT devices. Conventionally, this may have resulted in many incompatible proprietary data management methods. Generally, this has created a problem where it may be difficult for data from different sensors to be aggregated and compared. Typically, this may also increase costs for device-makers, who must create their own methods to store configuration and sensor data instead of focusing on the core features of the device. Usually, different standards may lead to poor implementations and difficult to integrate devices, as some vendors create higher quality solutions and some fail to do so.

In many embodiments, the current disclosure may enable a standard, open platform for storing and managing data. In certain embodiments, the current embodiment may use cloud object storage to enable a common standard for IoT devices. In certain embodiments, the current embodiment may enable a standardized method of self-registering to a master service. In many embodiments, the current disclosure may enable IoT devices from different vendors to interoperate on the same provider network. In many embodiments, the current disclosure may enable building an IoT database that stores an IoT device identifier. In many embodiments, the current disclosure may enable a self-registration scheme, which contacts a centralized database of Cloud Service Providers (CSPs) to route that device to the appropriate CSP. In certain embodiments, this may be enabled by creating a boot sequence in an IoT device that contacts a central database.

In most embodiments, IoT devices may leverage Wi-fi chipsets to connect to the internet. In many embodiments, an IoT device, once connected to wi-fi, may generally resolve names using the DNS and reach web servers via HTTP/S. In certain embodiments, a web-based registry may be hosted on a fixed, global, predetermined DNS name, e.g. "registry.objectstorage.io." In most embodiments, devices may be programmed to make an encrypted (HTTPS), signed (with a per-device secret) request to that registry containing their device identifier (e.g. the wireless MAC address), seeking a session with the device's Cloud Service Provider (CSP). In most embodiments, a Registry may look up an appropriate CSP, and the device secret, for the device, and may provide a response (signed with the device secret) directing the Device to the appropriate CSP. In some embodiments, a device may validate a signature to ensure that a registry is genuine. In many embodiments, a device may contact a CSP. In certain embodiments, when a device contacts a CSP it may provide signed data from a Registry and a device identifier for the IoT device. In some embodiments, a CSP may invalidate prior sessions for a device. In certain embodiments, a CSP may provide authentication information needed for a device to use the CSP.

In many embodiments, by integrating a boot process into a standard IoT chipset it may be possible to hide complexity from the users and designers or the device. In some embodiments, an open process to register mappings from device identifier to cloud service provider may be provided. In certain embodiments, a registry may enable operations like "Store<filename>" and "Read<filename>" to transparently access that device's storage space on the CSP. In some embodiments, store or read may use a standard object storage protocol to access a CSP. In most embodiments, other cloud services such as queuing may also be provided. In many embodiments, transparently connecting an IoT device to a CSP through a standardized interface may decrease complexity. In most embodiments, the current disclosure may enable developers to work on software of their device, instead of working on other interfaces.

In certain embodiments, data stored by an IoT device may be accessible to the device maker. In some embodiments, a CSP may provide credentials to a device maker, allowing the CSP to read and write objects in each device's cloud storage. In certain embodiments, enabling a device maker access to a device's storage in a CSP may enable two-way communication between the device maker and the device, even after it is deployed into a home.

In many embodiments, a chip set may be modified. In some embodiments, a chipset may be a wireless chipset. In most embodiments, a chipset may include a specific MAC address. In other embodiments, a chipset may include per MAC secrets. In some embodiments, the chipset may include a unique identifier. In further embodiments, a chipset may be enabled to reach out to a registry as part of the booting of the device. In further embodiments, a chipset may be enabled to reach out to a wireless registry once the device is connected to a wireless network.

In certain embodiments, a device maker may purchase service from a cloud service provider. In some embodiments, a device maker may register mac addresses with a registry to denote a cloud service provider for the registered mac addresses. In many embodiments, a device maker may provide a registry with a MAC address and MAC secret for an IoT device. In some embodiments, a device maker may provide a registry with a cloud service provider URL. In other embodiments, a device maker may provide a registry with an address for accessing cloud service provider.

In some embodiments, a device may connect to a network. In certain embodiments, a device may contact a domain name service. In many embodiments, a device may send a MAC address to a registry. In other embodiments, a device may send a unique identifier to a registry. In certain embodiments, a unique identifier may be sent by a hashed device secret. In most embodiments, a registry may provide a request with an address for a cloud service provider. In some embodiments, a registry may provide an URL for a cloud service provider to a requestor. In certain embodiments a registry may provide an authorization token to a request. In other embodiments, a registry may provide a signed by hash device secret to a requesting device. In certain embodiments, a device may contact a cloud service provide. In many embodiments, a device may provide an authorization token to a cloud service provider. In some embodiments, a cloud service provider may replace prior sessions for a contacting device. In many embodiments, a cloud service provider may provide the device with a session secret. In many embodiments, a device may use a session secret to store and access data stored with a cloud service provider. In certain embodiments, a device may use a plurality of protocols including but not limited to object store and REST. In many embodiments, a device connected to a cloud service provider may access storage in the cloud service provider as if the storage was local to the device. In many embodiments, a registry may have a database.

In certain embodiments, a registry or Cloud Service Registry may be a neutral, global database. In some embodiments, a registry may be similar to a generic Domain Name System (DNS). In most embodiments, a registry may maintain a global key/value store of <Device Identifier (MAC) >-><CSP session creation URL, device secret, CSP secret>. In certain embodiments, when a device boots, it may query a registry with its device identifier, and cryptographically sign that query with its device secret. In certain embodiments, a signature may be a SHA-1 hash of a string based on the concatenation of the device identifier (or MAC) with a device secret. In most embodiments, a hash may irreversible, so transmitting it to a fake CSR may not reveal a device secret. In most embodiments, a authentic registry may know a real device secret, the registry may create the same hash and compare them, and may authenticate the device, which may preventing cloning of device MACs. In certain embodiments, a registry may be a public registry. In other embodiments, a registry may be a private registry. In further embodiments, a device maker may set up a registry. In still further embodiments, multiple device maker may share a common registry.

In most embodiments, a registry may respond to valid requests with a device's assigned cloud service provider session creation URL, a timestamp, and an authorization message for the CSP signed using a per-CSP secret. In many embodiments, information provided by a registry may be signed with a device secret. In certain embodiments, a client device may verify the signature using its device secret and may know that this is an authentic registry. In some embodiments, a device may contact a cloud service provider at a session creation URL. In many embodiments, a device may send information from the registry to the cloud service device. In most embodiments, information sent to a cloud service device may include an authorization message. In some embodiments, a cloud service provider may check a signature in an authorization message. In many embodiments, a cloud service provider may know, via hash verification, that a device received authorization from a registry. In many embodiments, upon successful verification of a device, a cloud service provider may provide session setup information to a device.

In certain embodiments, a CSP may be any number of cloud services. In some embodiments, a CSP may be an object store. In other embodiments, a CSP may be a queuing service. In further embodiments, a CSP may be a streaming video broadcast reflector. In other embodiments, a CSP may be include read-only data to authenticate for billing purposes. In many embodiments, a CSP could contain data for authorizing a cable set top, TiVo guide data, or a real-time stock ticker. In many embodiments, any service that may need authentication, which may accept or return data may be or include a CSP. In most embodiments, different chipsets and different device types may to need one type of cloud service. In certain embodiments, different devices may switch between multiple CSPs that provide service at a choice of a device maker.

In certain embodiments, this may enable cloud service providers to compete with each other to provide service to a device. In some embodiments, there may be as many CSPs are there are devices. In most embodiments, CSPs may compete with each other for price and service. In certain embodiments, a device maker may choose one more CSPs for the device maker's devices. In other embodiments, a consumer or owner of the device may choose the CSP for the device. In some embodiments, a device maker may register device identifiers that the device maker is selling with a CSP. In certain embodiments, a device may have more than one service. In many embodiments, a device may contact a different registry for a different service. In some embodiments, a device may contact a same registry for different services. In many embodiments, a device may contact different cloud service providers for a different service. In some embodiments, a device may contact the same cloud service providers for different services. In still further embodiments, a registry may return an encoded object which may include a list of services. In some embodiments, an object with a list of services may include a list of services, each with a type, cloud service provider, and URL.

In some embodiments, a CSP may want to restrict service to the device(s) that are authorized to access it. In many embodiments, an end user of a device may have no role in registering the device. In most embodiments, an end user may transparently connect a device to a network and automatically, and transparently, have service for the device through a registry and cloud service provider. In many embodiment, the current disclosure may enable categories of devices capabilities to authenticate itself with none or little interaction from the end user, allowing a new level of ease of use.

Conventionally, a wireless-enabled thermostat for HVAC. Thermostats generates sensor data in the form of temperature, humidity, and the status of the HVAC system (on/off, heat/cool, etc.). Typically, Thermostats also hold and use configuration data (set temperature, fan override, etc.). Generally, each thermostat manufacturer must create their own method to load this configuration data, and also to store and use historical sensor data.

In an embodiment, a thermostat manufacturer may select a compliant wireless chipset for their device, which includes a command to contact a cloud registry. In certain embodiments, a manufacturer may register device identifiers of sets of chips that they purchase with a CSP to interact with the registered devices. In many embodiments, to load or store configuration, a standard key like "Read config.yaml" may be used. In some embodiments, a standard key may come from a device's specific space on a CSP. In certain embodiments, to store sensor data, a device may write to "Store current_temperature.txt", overwriting the latest temperature data in a cloud service provider.

In many embodiments, a device maker may create a website allowing customers to access data from and control their device over the web. In certain embodiments, website may read "current_temperature.txt" and display the temperature graphically. In many embodiments, a website may allow the user to remotely control their HVAC system, simply by overwriting the "config.yaml" file that the thermostat will regularly re-read.

In certain embodiments, it may not be possible to access a registry on the web. In particular embodiments, large enterprises or government agencies may have disconnected networks. In most embodiments, a disconnected network may be incompatible with a global registry. In certain embodiments, a licensed private Cloud Service Registry (CSR) may be created. In many embodiments, a fixed, global DNS name (e.g. "registry.objectstorage.io") may be overridden with pointers to a private registry. In most embodiments, if a private registry is loaded with the device identifiers (MAC addresses) and device secrets (available from the chipset manufacturer), the private registry may redirect the device to a private Cloud Service Provider within an enterprise. In most embodiments, a private registry and custom DNS server may allow same simple device configuration and same centralized data access using private resources within a network or enterprise.

Figure 2:
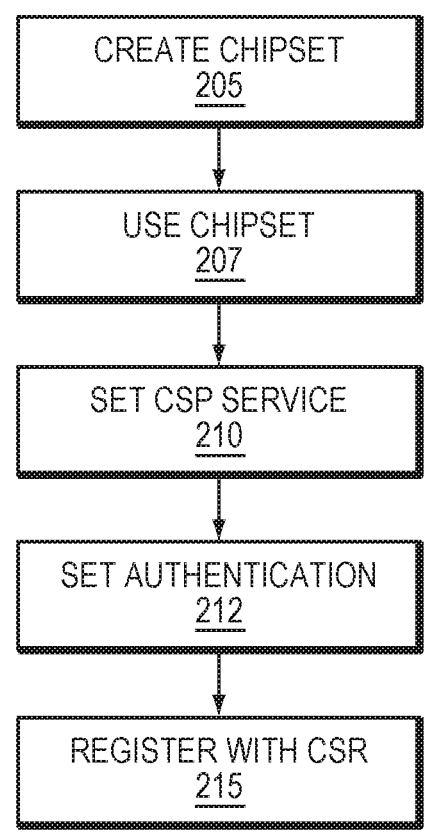
FIG. 2 is a simplified method for enabling an IoT device to communicate with a cloud service provider, in accordance with an embodiment of the present invention.

Refer now to the example embodiments of FIGS. 1 and 2, which illustrate an example embodiment of setting up a cloud service provider for a unique ID. Chipset manufacturer 115 creates chipset 117 that includes a command to contact cloud service registry 130 as part of initialization on a network (step 205). IoT device maker 120 receives chipset 117 and uses the chipset to make IoT devices (step 207). The chipsets each have a unique ID and a secret. IoT device maker 120 contacts cloud service provider 125 and to enable IoT devices to interact with cloud service provider 125 (step 210). IoT Device maker provides cloud service provider with an authorization method for IoT devices enabled to interact with it (step 212). IoT device manufacturer provides information linking the unique ID and secret to cloud service registry 130 (step 215). When an IoT device from IoT Device maker 120 contacts cloud service registry 130, cloud service registry 130 will provide the device with an address for cloud service provider 125.

In certain embodiments, a unique identifier may be a MAC address. In some embodiments, a secret may be a MAC secret. In many embodiments, an address may be an URL. In certain embodiment, a device maker may provide a MAC address and per-MAC secret and CSP URL to a cloud service registry.

Figure 3:
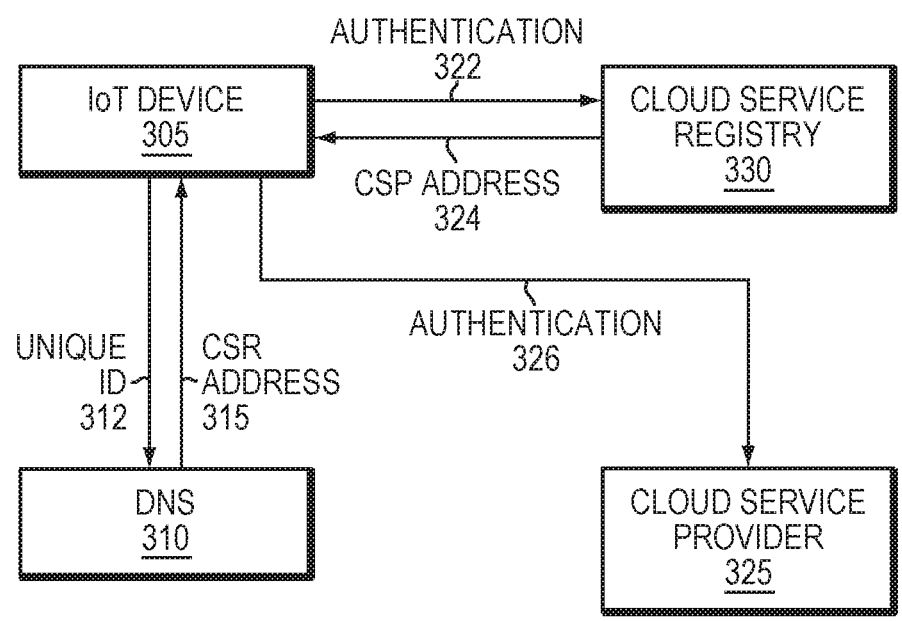
FIG. 3 is a simplified illustration of an IoT device registering with a cloud service provider, in accordance with an embodiment of the present invention.
Figure 4:
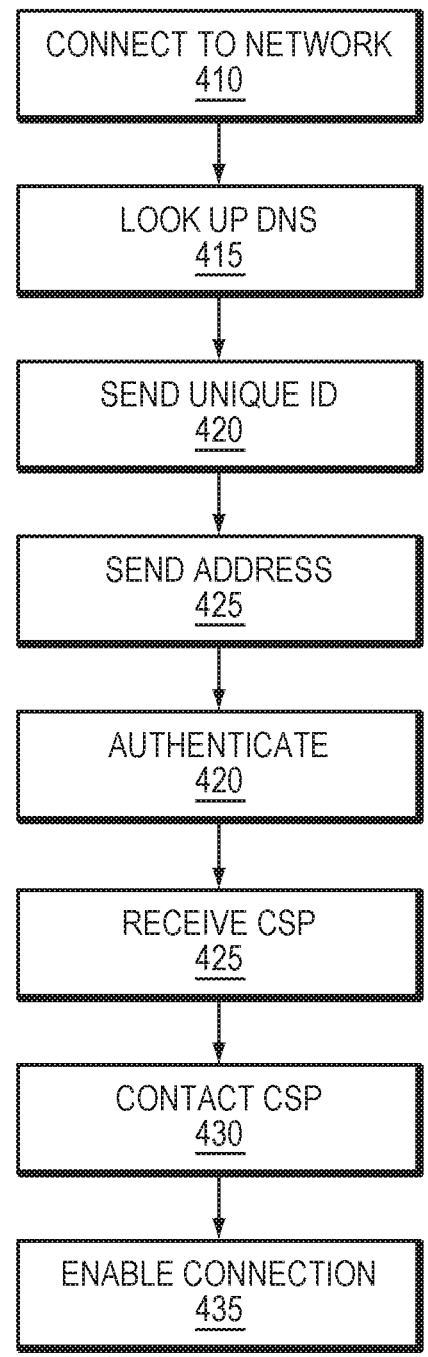
FIG. 4 is a simplified method for enabling an IoT device to register with a cloud service provider, in accordance with an embodiment of the present invention.

Refer now to the example embodiments of FIGS. 3 and 4, which illustrate registering an IoT device with a cloud service provider. IoT Device 305 connects to a network (step 410). IoT device 305 contacts DNS 310 with unique ID 312 (step 415 and Step 420). DNS 310 responds to IoT device 305 with CSR address 315 (step 425). IoT device 305 contacts cloud service Registry 330 with authentication 322 and authenticates (step 420). Cloud service registry 330 provides IoT device 305 with CSP address 324 (step 425). IoT Device contacts Cloud Service Provider 325 with authentication 326 and establishes a connection with CSP 325 (step 425 and Step 430). IoT Device 305 may now use CSP 325 to store and retrieve information. In other embodiments, IoT Device 305 may use CSP 325 to perform actions such as analytics on data stored on Cloud Service Provider. In certain embodiments, a CSP may use a session secret for authentication of an IoT Device.

Figure 5:
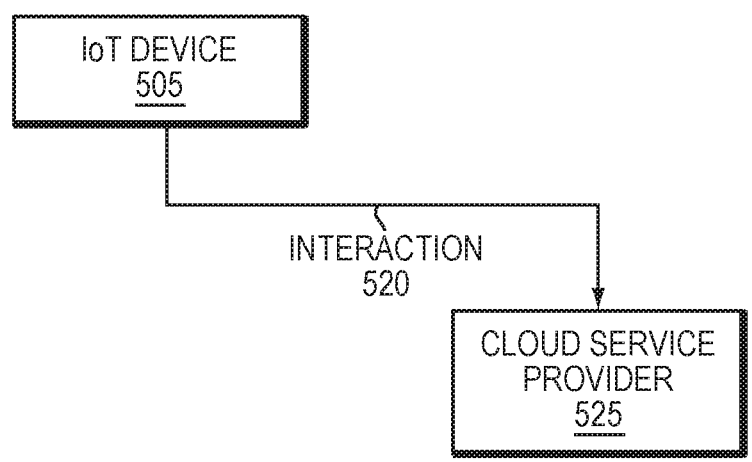
FIG. 5 is a simplified illustration of an IoT device interacting with a cloud service provider, in accordance with an embodiment of the present invention.
Figure 6:
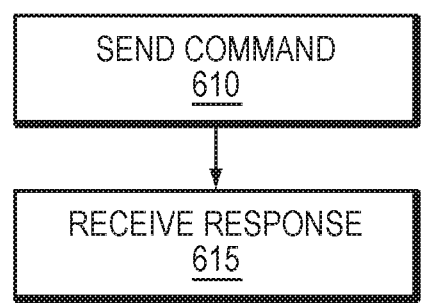
FIG. 6 is a simplified method for enabling an IoT device to interact with a cloud service provider, in accordance with an embodiment of the present invention.

Refer now to the example embodiments of FIGS. 5 and 6, which illustrate interactions between an IoT Device and a Cloud Service Provider. IoT Device 505 sends a command, such as interaction 520, to Cloud Service Provider 525 (step 610). IoT Device 505 receives a response from Cloud Service Provider 525 (step 615). In certain embodiments, a command may be a read command. In other embodiments, a command may be a write command. In further embodiments, a command may be a request for analytics. In certain embodiments, an IoT device may have logic stored in a cloud service provider to enable more complex computations. In further embodiments, an IoT may be enabled to have a smaller foot print as it may provide measurements to a cloud service provider and receive instructions based on those measurements. In further embodiments, an IoT may use a cloud service provider to store very long activity histories which would not fit on a device's internal memory.

Figure 7:
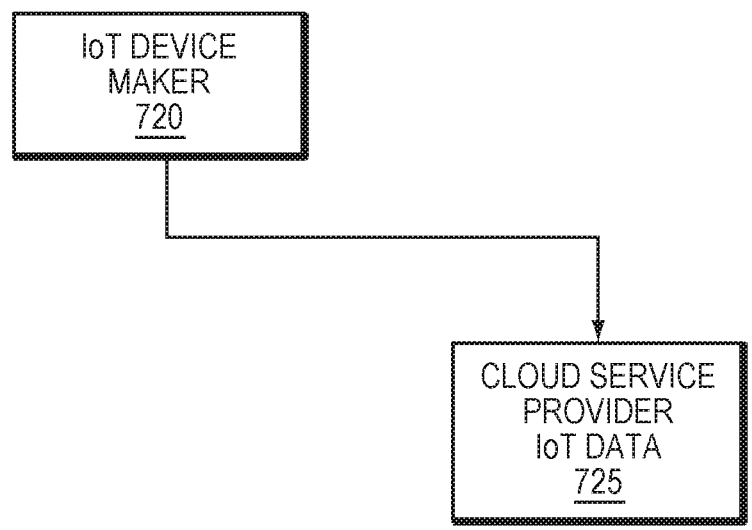
FIG. 7 is a simplified illustration of an IoT device manufacturer interacting with a cloud service provider, in accordance with an embodiment of the present invention.
Figure 8:
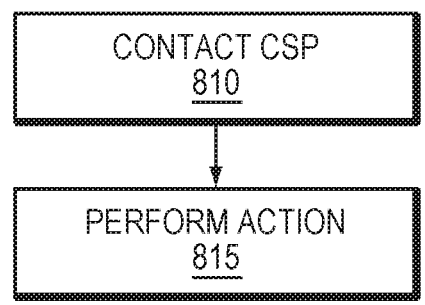
FIG. 8 is a simplified method for enabling an IoT device manufacturer to interact with a cloud service provider, in accordance with an embodiment of the present invention.

Refer now to the example embodiments of FIGS. 7 and 8, which illustrate an IoT Device Maker interacting with a Cloud Service Provider. IoT Device Maker 720 contacts Cloud Service Provider 725 (step 810). IoT Device Make 720 has an action performed on IoT Device Data stored on Cloud Service Provider 725 (step 815). In certain embodiments, an IoT Device Maker may have access to data in a cloud service provider corresponding to its IoT Devices. In some embodiments, an IoT Device maker may perform analytics on data of its IoT devices in a cloud service provider. In many embodiments, an IoT Device maker may update its IoT devices using a cloud service provider. In certain embodiments, an IoT Device maker may change data of its IoT devices in a cloud service provider. In further embodiments, systems of IoT devices may interact by sending data to a CSP, and having software from the Device Maker analyze the combined status and/or issue commands for mass actions.

Figure 9:
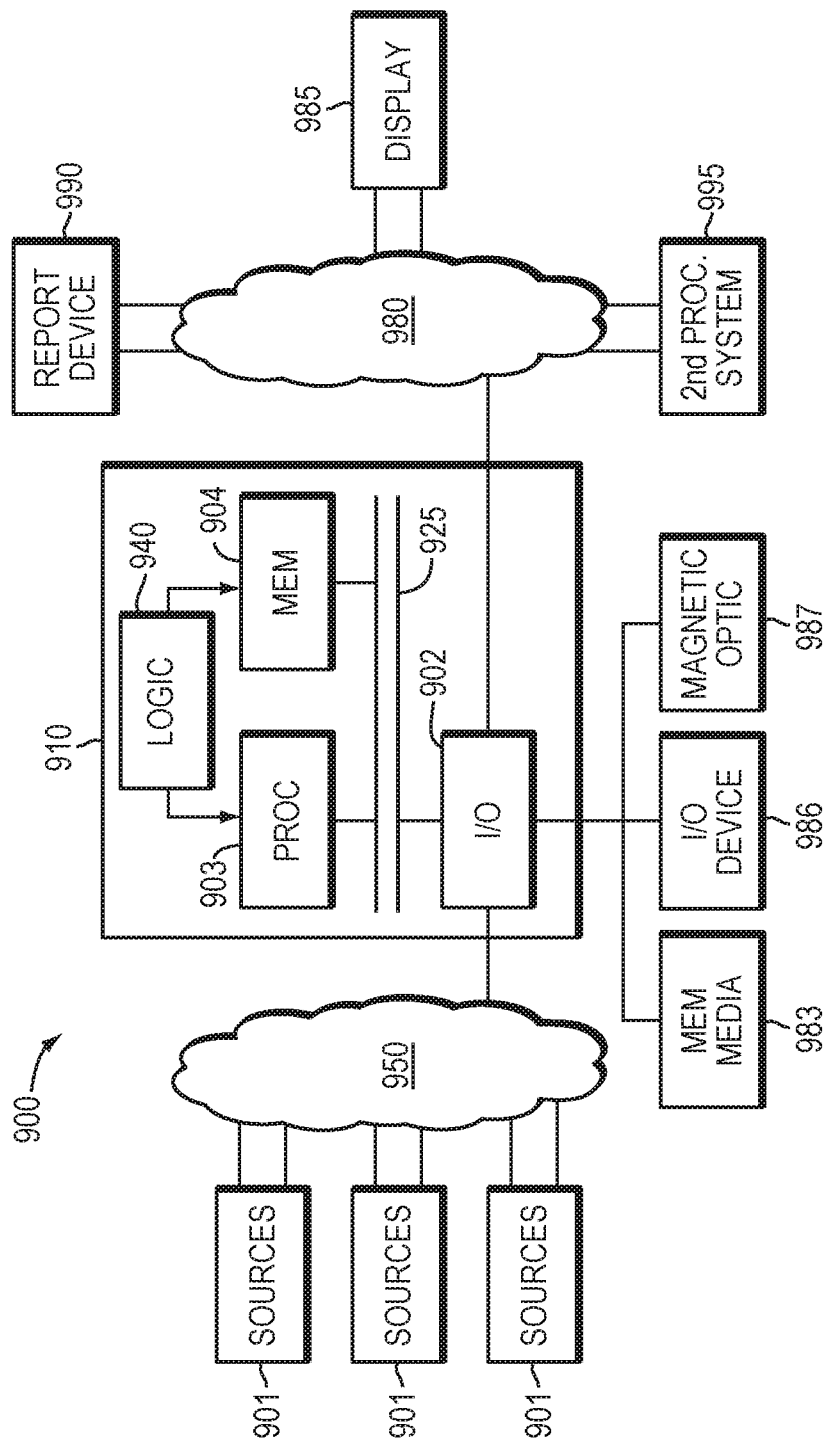
FIG. 9 is an example of an embodiment of an apparatus that may utilize the techniques described herein, in accordance with an embodiment of the present disclosure.
Figure 10:
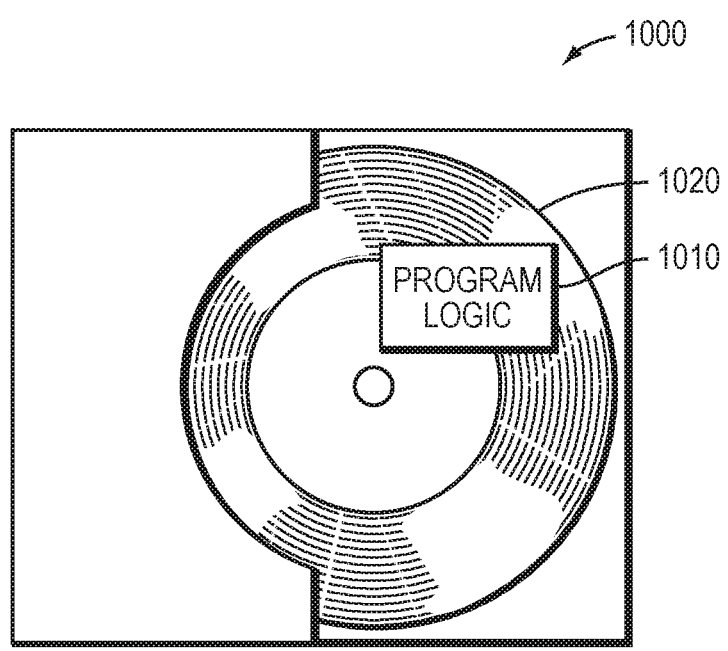
FIG. 10 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor 903 to provide a unique apparatus that operates analogously to specific logic circuits. As such a general purpose digital machine can be transformed into a special purpose digital machine. FIG. 10 shows Logic 1010 embodied on a computer-readable medium 1020 as shown, and wherein the Logic is encoded in computer-executable code configured for carrying out the reservation service process of this invention and thereby forming a Computer Program Product 1000. The Logic 1010 may be the same logic 940 on memory 904 loaded on processor 903. The program logic may also be embodied in software modules, as modules, or as hardware modules. The program logic may be run on a physical or virtual processor. The program logic may be run across one or more a physical or virtual processors.

The logic for carrying out the method may be embodied as part of the system described below, which is useful for carrying out a method described with reference to embodiments shown in, for example, FIGS. 2, 5, 6, and 8. For purposes of illustrating the present invention, the invention is described as embodied in a specific configuration and using special logical arrangements, but one skilled in the art will appreciate that the device is not limited to the specific configuration but rather only by the claims included with this specification.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A system, comprising:
   a registry; and
   computer-executable logic enabled to be executed across one or more processors, the logic configured to:
   receive, by the registry, a request from a requester to connect to a provider, wherein the registry comprises a respective plurality of unique IDs for a plurality of requesters and a respective plurality of requester secrets for the plurality of requesters, wherein the requester comprises a chipset comprising a command to contact the registry;
   authenticate, by the registry, the requester using a requester secret associated with the requester;
   verify, by the requester, an authenticity of the registry, using the requester secret;
   based on a successful authentication and verification:
      receive, by the registry, a unique ID from the requester;
      look up, by the registry, the unique ID from the requester; and
      after authentication between the registry and the requester, send, by the registry, an address of the provider to the requester; and
      wherein the requester self-registers with the provider, using the address provided by the registry.

2. The system of claim 1, wherein the unique ID is a MAC address.

3. The system of claim 1, wherein the address is an URL.

4. The system of claim 1, wherein the address provides the requester with a location of a cloud service provider.

5. The system of claim 1, wherein a chipset manufacturer provides the requester secret allowing the requester to self-register with at least one provider, wherein the requester comprises a chipset.

6. The system of claim 1, wherein the requester self-registers with the provider by contacting the registry, wherein the registry routes the requester to an appropriate provider for the requester.

7. The system of claim 1 wherein the requester is an IoT device.

8. The system of claim 7, wherein the IoT device executes a set of commands upon connecting to a network, wherein the commands include contacting the registry and contacting the cloud service provider.

9. A computer implemented method comprising:
receiving, by a registry, a request from a requester to connect to a provider, wherein the registry comprises a respective plurality of unique IDs for a plurality of requesters and a respective plurality of requester secrets for the plurality of requesters, wherein the requester comprises a chipset comprising a command to contact the registry;
authenticating, by the registry, the requester using a requester secret associated with the requester;
verifying, by the requester, an authenticity of the registry, using the requester secret;
based on a successful authentication and verification:
receiving, by the registry, a unique ID from the requester;
looking up, by the registry, the unique ID from the requester; and
after authentication between the registry and the requester, sending, by the registry, an address of the provider to the requester; and
wherein the requester self-registers with the provider, using the address provided by the registry.

10. The method of claim 9, wherein the unique ID is a MAC address.

11. The method of claim 9, wherein the address is an URL.

12. The method of claim 9, wherein the address provides the requester with a location of a cloud service provider.

13. The method of claim 9 wherein the requester is an IoT device.

14. The method of claim 13, wherein the IoT device executes a set of commands upon connecting to a network, wherein the commands include contacting the registry and contacting the cloud service provider.

15. A computer program product for use in a cloud router comprising:
a non-transitory computer readable medium encoded with computer executable program code for using read signatures in a cloud router, the code configured to enable the execution of:
receiving, by a registry, a request from a requester to connect to a provider, wherein the registry comprises a respective plurality of unique IDs for a plurality of requesters and a respective plurality of requester secrets for the plurality of requesters, wherein the requester comprises a chipset comprising a command to contact the registry;
authenticating, by the registry, the requester using a requester secret associated with the requester;
verifying, by the requester, an authenticity of the registry, using the requester secret;
based on a successful authentication and verification:
receiving, by the registry, a unique ID from the requester;
looking up, by the registry, the unique ID from the requester; and
after authentication between the registry and the requester, sending, by the registry, an address of the provider to the requester; and
wherein the requester self-registers with the provider, using the address provided by the registry.

16. The computer program product of claim 15, wherein the unique ID is a MAC address.

17. The computer program product of claim 15, wherein the address is an URL.

18. The computer program product of claim 15, wherein the address provides the requester with a location of a cloud service provider.

19. The computer program product of claim 15, wherein the requester is an IoT device.

20. The computer program product of claim 19, wherein the IoT device executes a set of commands upon connecting to a network, wherein the commands include contacting the registry and contacting the cloud service provider.

* * * * *